United States Patent Office 3,567,808
Patented Mar. 2, 1971

3,567,808
PRODUCTION OF LOW DENSITY-HIGH STRENGTH CARBON
Mark J. Smith, Emporium, Pa., assignor to Air Reduction Company, Incorporated, New York, N.Y.
No Drawing. Continuation-in-part of application Ser. No. 665,307, Sept. 5, 1967. This application Nov. 18, 1969, Ser. No. 877,846
Int. Cl. C01b 31/02
U.S. Cl. 264—29        4 Claims

ABSTRACT OF THE DISCLOSURE

The production of low density, high strength carbon articles using ammonium lignin sulfonate, coconut shell particles, and pitch binders as basic starting materials.

---

This application is a continuation-in-part of U.S. application Ser. No. 665,307 filed Sept. 5, 1967, now abandoned.

BACKGROUND OF THE INVENTION

This invention pertains to the production of carbon articles which have low density, high strength and low thermal conductivity, which are particularly useful as insulation material.

In the fabrication and processing of high density ceramics and graphites by hot molding techniques, a key factor in the design of a high temperature furnace is the availability of suitable materials to insulate the press platens from the relatively high temperatures induced in process specimens. In many such instances, operating temperatures above 2500° C. and compressive loads above 7,000 p.s.i. are generated. Under these conditions, an ideal insulating material would possess a relatively low thermal conductivity, a compressive strength in excess of the pressure applied against the specimen, the ability to be heated to extremely high temperatures without melting or subliming, and should be extremely resistant to inductive heat generation.

Various refractory materials, including a wide range of porous and lampblack carbons, have been used as insulating platens in the high temperature molding processes referred to. While these carbons were suitable with respect to low thermal conductivity and high temperature stability they failed to meet compressive strength specifications. The possibility of producing a carbon or graphite material with a combination of low thermal conductivity and high strength might appear to be quite remote since in conventional graphite technology these two properties are incompatible. High strength usually is accompanied by high density and high thermal conductivity while low density, although associated with low thermal conductivity, has the disadvantage of low strength.

In accordance with the foregoing, it is an object of this invention to prepare carbon articles of low density and low thermal conductivity which also have a high compressive strength.

It is a further object of this invention to prepare carbon articles which have low density and low thermal conductivity rendering them suitable for operations at temperatures around 2500° C. with compressive strength under these conditions in excess of 5,000 p.s.i.

These and other objects will appear more clearly from the detailed specification which follows.

SUMMARY OF THE INVENTION

In accordance with the present invention it has now been found that carbon articles of low density and low thermal conductivity which also have high strength, can be prepared by using as the major ingredient a high surface area material made by carbonizing the reaction product of strong hydroxides and lignin sulfonic acids. A typical starting material used in formulating this invention, for example, is the powdered ammonium derivative of the sulfonic acid made by spray drying an aqueous reaction solution of ammonium hydroxide and refined digester liquor from sulfite pulp manufacturing.

The resulting ammonium lignin sulfonate is converted to a char by carbonizing the same in a muffle furnace heated rapidly to about 900° C. It is also possible to prepare carbon articles having the desired low density and low thermal conductivity coupled with high strength, by using such ammoniated lignin sulfonic acid chars in combination with carbonized coconut shell particles, prepared in a manner similar to that used for the lignin char. Various materials such as the ammoniated lignin sulfonic acids, petroleum pitch and coal tar pitch are thereafter used to bind the recovered carbonized filler materials into the desired molded carbon blocks. The amount of binder used may vary from 20 to 50 percent of the mixture depending for the most part upon the particle size of the filler, coarser filler particles in general requiring smaller amounts and finer filler particles requiring larger amounts of the binder. Coal tar pitch is the preferred binder.

The particle size of the ammonium lignin sulfonic acid char and the coconut char determine the pore size and pore uniformity in the finished carbon article. Uniform size particles will produce uniform size pores while random size particles will produce random size pores. As indicated previously the particle size also determines the amount of binder necessary to form the carbon body.

In shaping carbon blocks from the mixture of char particles and binder it is preferred to use a heated platen molding press. Since pitch binders are available with various softening and melting points, the temperature of the press platen will vary depending on the pitch selected. The mixture is poured into the mold on the press where it is heated and compressed to form the finished article. The temperature of the platen should be approximately the softening point of the pitch being employed. At the softening point the pitch will be plastic enough to blend with and cover the particles. If the pitch is heated to its melting point it becomes very fluid being difficult to contain in the mold or to prevent from settling through the particles.

The pressure used in forming the carbon body can be from approximately 1 ton/in.$^2$ to 5 ton/in.$^2$. The preferred range of pressures is 3–4 ton/in.$^2$. If too low a pressure is used in forming the carbon body it will have low physical strength. If excessive pressure is used the char particles can be crushed altering any preselection of the pore size in the finished body. Excessive pressure also forms shear lines resulting in laminations in the block which tend to be weak. In the preferred pressure range the body develops its maximum strength while preserving its low density and pore size.

DESCRIPTION OF PREFERRED EMBODIMENTS

The following examples are illustrative of the present invention:

Example I

A char was made by carbonizing ammonium lignin sulfonate with the exclusion of air in a muffle furnace at a heating rate of 200° C./hour. The ammonium lignin sulfonate utilized was a commercial product marketed under the name "Orzan A" by Crown-Zellerback Corporation, Camas, Wash. While other reacted lignins can be similarly employed, the Orzan A product was found to have a particularly convenient form. The resultant char was cooled to room temperature and removed from the refractory sagger which served to contain it while being heated. The char in its "as baked" condition had a laminar structure and a density of ca. 0.25 g./cm.³. The cooled char was reduced to the appropriate particle dimensions for formulating the porous materials by pulverizing in a hammermill and separating by standard screens on a "Rotap" shaker. 70 parts of the 65/200 size particles were blended with 30 parts of a medium No. 30 coal tar pitch for a 5 minute period in a twin-shell blender and the resultant blend was mixed in a sigma-blade mixer for 30 minutes. The resultant mixture was crushed in a jaw crusher to pass a standard 40-mesh screen. The resulting powder was fabricated into blocks measuring 1½ in. x 4½ in. x 6 in. and 3 in. x 3¾ in. x 4¾ in. on a heated platen, molding press using a molding pressure of 3–4 ton/in.².

The molded blocks were packed in a carbonized-sand mixture within silicon carbide saggers and baked in a muffle furnace to 900° C. at 6° C./hr. R.T. to 600° C., 12° C./hr.–600° C. to 900° C., and soaked at 900° C. for 1 hour.

At this heating rate the block can be brought up to 900° C. rapidly without cracking due to thermal stress. Slower heating rates can be employed, however this would require excessive furnace time. The optimum heating rate is that which will bring the body to temperature without cracking while using the minimum furnace time.

The molded blocks had a density of 1.11 g./cc. when green and 1.09 g./cc. when baked. The blocks had good dimensional stability and showed slight shrinkage and had a flexural strength of 3700 p.s.i. and a compressive strengh of 16,000 p.s.i. The electrical resistivity of the blocks was 581.0 ohm-in.×10⁴ and C.T.E. (coefficient of thermal expansion) of $3.03 \times 10^{-6}$ in./in./° C. parallel and 3.24 perpendicular, and a thermal conductivity of 0.0021 cgs. units. Porosity tests of the blocks showed none greater than 100µ; 0.172 cc./g. 100µ/0.06µ and 0.231 cc./g. less than 0.06µ or a total of 0.403 cc./g. when baked. The porosity indicates that a large proportion of the pores are of the closed or inaccessible type, thereby inhibiting the access of air or other gases into the interior of the body. This type of pore structure produces a more oxidatively stable carbon body because oxidation will only occur on the surface rather than throughout the body.

Selected specimens of the baked products were graphitized by further heat treatment to 2750° C. in an induction furnace operated by means of a 40 kilowatt, spark-gap induction generator. Graphitizing was performed with a 100° C./hr. heating rate from 900° C. to 2750° C.

The rate of heating to the graphitization temperature is selected to provide for rapid heating of the block without cracking due to thermal stress while at the same time using a minimum of furnace time.

The graphitized blocks had an apparent density of 1.17 to 1.22 g./cc., He density of 1.61 g./cc., electrical resistivity of 19.97–22.1 ohm in.×10⁴, flexure strength of 3034–3245 p.s.i., and compressive strength of 8286–8782 p.s.i.; permeability of 1.46 cm.² per second; C.T.E. of $4.01 \times 10^{-6}$ parallel and $3.72 \times 16^{-6}$ perpendicular, and had a thermal conductivity of 0.019 cgs. units. X-ray properties were interlayer space: 3.3807–3.3880; crystalline size: 115–211; pref. orient. 20. Porosity of the graphitized blocks showed 0.008 cc./g. greater than 100µ; 0.220 cc./g. 100µ/0.06µ; and 0.186 cc./g. less than 0.06µ or a total of 0.414 cc./g. A porosity examination showed that most pores were of the closed or inaccessible type. Hardness of the graphitized blocks was 93 on the Rockwell "R" Scale.

In general then, these products possess a good porous structure, insulating properties, and will support much higher compressive loads than porous carbons made with petroleum coke fillers which have compressive strengths of about 1400–1600 p.s.i. In addition, the pores of the products are mainly of the closed variety in that the free passage of air through the block is highly inhibited.

Example II

Coconut shells ground to 8 mesh (U.S. sieve series) were carbonized with the exclusion of air in a muffle furnace heated at a rate of 200° C./hr. to 900° C. The carbonized residue was ground to pass a 100 mesh (U.S. sieve series) and then blended intimately with ammonium lignin sulfonate (Orzan A) in a 50–50 weight ratio. The blend was combined at room temperature in a sigma-blade mixer with enough solvent (water, in this case) to form a slurry. The resultant solution-suspension was mixed constantly while the temperature of the mixture was increased steadily to evaporate the solvent. As the solvent was eliminated the mixture became increasingly viscous—to the point of actual solidification. Just before solidification occurred, the mixer was discharged and drying was completed by heating in an oven at 110° C. for 12 hours.

The dried mixture was broken into nuggets and carbonized with the exclusion of air in a muffle furnace heated at a rate of 200° C./hr. to 900° C. The resulting residue called a "calcine" was ground to 65/200, 65/100 and 35/65 mesh fractions, hereinafter designated Samples A, B and C respectively. Each of these samples was mixed with an appropriate quantity of No. 30 medium coal tar pitch. (Quantities were 30%, 30% and 20% for Samples A, B and C respectively.) Each combination was mixed thoroughly at 140° C., granulated in a jaw crusher to pass a standard 40-mesh screen and molded into 4½ in. x 6 in. rectangular blocks about 3 in. thick on a heated-platen molding press using a molding pressure of 3–4 tons/in.².

The molded blocks were packed in a carbonized-sand mixture within silicon carbide saggers and baked in a muffle furnace at the following baking schedule: 3° C./hr.–R.T. to 600° C., 66° C./hr.–600° C. to 900° C., with a soak at 900° C. for 1 hr. Selected specimens of the baked blocks were graphitized by further heat treatment to 2750° C. in an induction furnace at a 100° C./hr. heating rate from 900° C. to 2750° C. Specimens were cut from the baked or carbonized blocks (designated Samples AC, BC and CC) and graphitized blocks (designated Samples AG, BG and CG) and characterized according to established testing procedures. The properties of these specimens are summarized in Table I.

The pore volume of Sample A, carbonized and graphitized, and the X-ray properties graphitized of Samples A, B and C were determined and are summarized in Table II.

The data in Table II clearly shows that two related types of low density-high strength carbon and graphite molded materials have been prepared from economical and readily available materials. Both products, in either the carbon or graphite forms, possess unique properties such as: a high strength-weight ratio; a low thermal conductivity; a C.T.E. of nearly unity in the graphitized state; and a high closed pore volume in both states. Samples AG, BG and CG have essentially all closed pores since the porosity could not be measured by the testing technique employed.

The density of the carbonized and graphitized material produced through the process of the present invention is substantially lower than that usually associated with carbon materials of high compressive strength. The apparent density of materials produced through the process are below 1.3 g./cc. while the compressive strength is in excess of 5,000 p.s.i. In order to approach this same compressive strength with conventional carbon or graphite material the density is usually in the range of 1.5 to 1.8 g./cc.

The character of the properties demonstrates that these low density materials adequately fulfill the requirements for use in high temperature furnaces for producing ceramics and graphites by hot molding techniques. Many other uses are suggested such as high temperature insulation, refractory brick, radiation shields, as well as any other high temperature application where high loading eliminates consideration of regular porous carbon or graphite grades.

(a) heating coconut shell particles to about 900° C. to convert the particles to a carbon residue;
(b) pulverizing and screening the carbon residue to obtain carbon particles;

TABLE I.—PROPERTIES OF POROUS MATERIALS

| Sample No.[1] | Density (g./cc.) Green | Density (g./cc.) Baked | Strength (p.s.i.) Flexural | Strength (p.s.i.) Compressive | Electrical resistivity ohm-in.×10⁴ | C.T.E.×10⁶ Parallel | C.T.E.×10⁶ Perpendicular | Thermal conductivity, cgs. units | Remarks |
|---|---|---|---|---|---|---|---|---|---|
| AC | 1.10 | 1.07 | 3,300 | 17,000 | 70.9 | 2.65 | 3.20 | 0.0027 | Good dimensional stability, slight shrinkage. |
| AG[2] | | 1.27 | 2,264 | 7,227 | 19.38 | 4.40 | 4.18 | 0.027 | Good structure and stability. |
| BC | 1.12 | 1.07 | 2,300 | 10,000 | | | | | |
| BG | | 1.28 | 2,446 | 5,935 | 16.2 | | | | |
| CC | 1.32 | 1.03 | 2,000 | 6,000 | | | | | Good structure and stability. |
| CG | | 1.26 | 1,963 | 6,103 | 17.0 | | | | |

[1] C designates a carbon specimen; G designates a graphite specimen.
[2] Sample AG on testing showed a He density of 1.61 g./cc. and permeability of 2.77 cm.²/sec.

TABLE II

| Sample | X-ray properties Inter. space | X-ray properties X-tal. size | X-ray properties Pref. orient. | Porosity, cc./g., 100µ 100µ | Porosity, cc./g., 100µ 0.60µ | Porosity, cc./g., 100µ 0.60µ | Porosity, cc./g., 100µ Total |
|---|---|---|---|---|---|---|---|
| AC | | | | 0.010 | 0.194 | 0.227 | 0.481 |
| AG[1] | 3.3744 | 232 | 32 | | | | |
| BG | 3.3800 | 141 | | | | | |
| CG | 3.3764 | 159 | | | | | |

[1] Sample AG had a hardness of 77 on the "R" Scale.

I claim:
1. A process for making carbon articles of low density, low thermal conductivity and high compressive strength, comprising the following steps:
   (a) heating an ammonium lignin sulfonate to about 900° C. to convert the sulfonate to a carbon char;
   (b) pulverizing the carbon char to form carbon particles;
   (c) mixing the carbon particles with a pitch binder;
   (d) crushing the mixture to form a powder;
   (e) shaping the powder at a temperature at which the binder is plastic and a pressure between about 1 ton/in.² and 5 tons/in.² into a formed article; and
   (f) baking the formed article to prepare a rigid carbon article having a large proportion of closed pores, a density of less than 1.3 g./cc. and a compressive strength of at least 5,000 p.s.i.

2. A process, as set forth in claim 1, wherein the rigid carbon article is subjected to further heat treatment at temperatures of about 2750° C. to graphitize the formed carbon article.

3. A process for making carbon articles of low density low thermal conductivity and high compressive strength comprising the following steps:

(c) mixing the carbon particles obtained from the coconut shell with an ammonium lignin sulfonate to form a solid mixture;
(d) crushing the mixture into particles;
(e) carbonizing the particles by heating to a temperature of about 900° C.;
(f) mixing the carbonized particles with a binder;
(g) crushing the mixture to form a powder;
(h) shaping the powder at a temperature at which the binder is plastic and a pressure between about 1 ton/in.² and 5 tons/in.² into a formed article; and
(i) baking the formed article to prepare a rigid carbon article having a large proportion of closed pores, a density of less than 1.3 g./cc. and a compressive strength of at least 5,000 p.s.i.

4. A process as set forth in claim 3 wherein the rigid carbon article is subjected to further heat treatment at temperatures of about 2750° C. to graphitize the formed carbon article.

References Cited
UNITED STATES PATENTS

| 2,527,595 | 10/1950 | Swallen et al. | 106—56 |
| 3,001,237 | 9/1961 | Balaguer | 264—29 |
| 3,219,731 | 11/1965 | Etzel et al. | 264—29 |
| 3,346,678 | 10/1967 | Ohlgren | 264—29 |
| 3,419,645 | 12/1968 | Pietzka et al. | 264—29 |

FOREIGN PATENTS

| 635,737 | 1/1962 | Canada | 23—209.1 |

EDWARD J. MEROS, Primary Examiner

U.S. Cl. X.R.
23—209.1